F. F. PETERS.
SAW.
APPLICATION FILED NOV. 24, 1920.
1,412,315.   Patented Apr. 11, 1922.
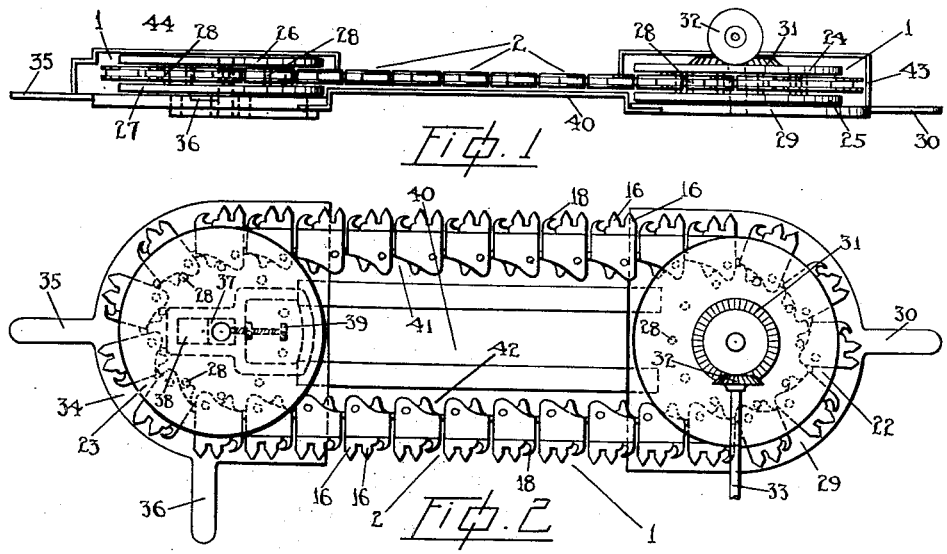
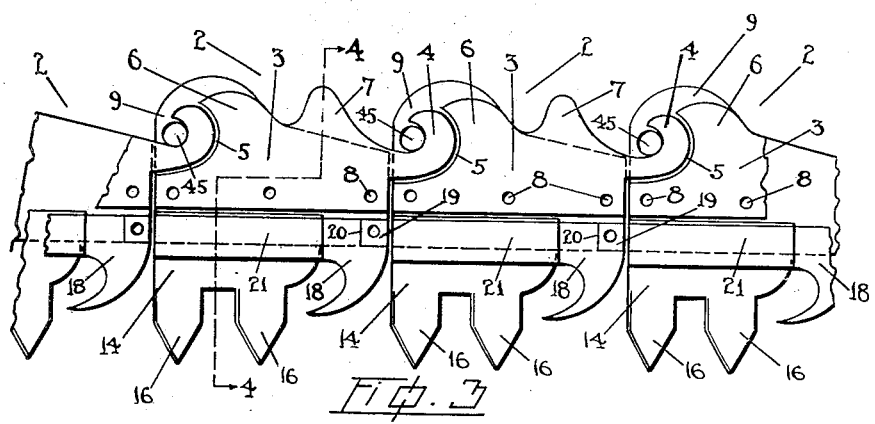
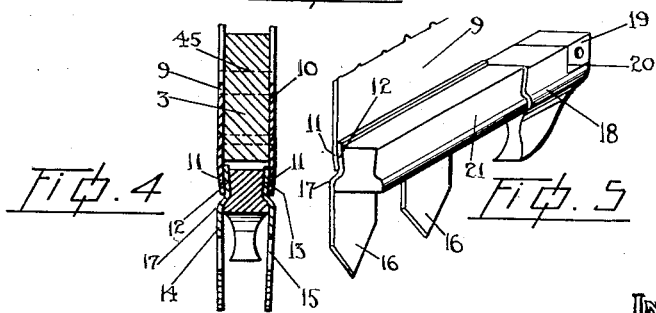
INVENTOR
Franklin Ford Peters.
BY
ATTYS.

UNITED STATES PATENT OFFICE.

FRANKLIN FORD PETERS, OF VANCOUVER, BRITISH COLUMBIA, CANADA.

SAW.

1,412,315. Specification of Letters Patent. Patented Apr. 11, 1922.

Application filed November 24, 1920. Serial No. 426,179.

*To all whom it may concern:*

Be it known that I, FRANKLIN FORD PETERS, a subject of the King of Great Britain, and a resident of the city of Vancouver, in the Province of British Columbia, Canada, have invented certain new and useful Improvements in Saws, of which the following is a specification.

My invention relates to improvements in saws, and the object of my invention is to devise a sectional mechanically operated saw which is light and portable and which is of great practical service in the cutting down of standing timber, although it may well be employed with equal facility in sawing timber in sawmills or elsewhere. A further object is to devise a sectional saw in which the joints are so designed that the saw will turn freely round its sprockets but which will thereafter lock securely so that the saw acts as a solid blade when passing through the timber. A still further object is to provide a saw of the character described in which the saw teeth are removable with great ease and convenience so that they may be sharpened or replaced when necessary expeditiously and with the minimum of trouble.

I attain these objects by the construction illustrated in the accompanying drawings in which—

Fig. 1 is an edge view of the saw.

Fig. 2 is a plan view of Fig. 1.

Fig. 3 is an enlarged fragmentary view of the saw, the near side teeth being removed.

Fig. 4 is a sectional view taken on the line 4—4 of Fig. 3.

Fig. 5 is a perspective view of the dovetail key and raker tooth.

Similar figures of reference indicate similar parts throughout the several views.

1 indicates generally the saw blade, which is composed of a number of sections 2, similar to the sections shown in Figs. 3 and 4, and which should be particularly described as follows. A section consists of a block 3 provided at one end with a hook member 4 while out of its opposite end is cut a portion 5 the shape and size of which portion is such that the hook 4 of an adjoining section will fit freely therein, the member 4 and the cut out portion 5 of two adjoining sections being complementary to each other, as shown more particularly in Fig. 3. On the edge remote from the saw teeth, mentioned later, the block 3 is provided with a pair of teeth 6 and 7 between which the pins or teeth of the driving and driven sprockets, hereinafter described, engage.

Secured by suitable rivets 8 to both sides of the block 3 are plates 9 and 10, these plates being the same length as the block but of greater depth than it and the projecting portions of the plates are bent slightly inwardly, as indicated at 11 in Fig. 4, and between these projecting portions are fitted the upper parts 12 and 13 of the outer saw blades 14 and 15, the saw teeth 16 being cut out of the lower parts of the blades and formed as shown in Fig. 3, and each blade 14 and 15 is offset slightly, as indicated at 17 in Fig. 4. The blades 14 and 15 are shorter than the block 3 so as to allow of the insertion of a tooth 18 between the ends of the blades and a block 19 secured between the plates 9 and 10 at their extreme ends, the upper part of the tooth 18 being cut away on the rear side, as indicated at 20 in Figs. 3 and 5, to fit the block, while the tooth itself is of less width than the space between the blades 14 and 15, this tooth 18 acting in effect as a raker. The saw blades and the raker tooth are held securely in place by a key 21 formed to fit tightly the space enclosed by the upper parts of the saw blades, which is substantially dovetail in formation, so that when the key 21 is forced into place the upper ends of the blades are forced tightly against the inbent portions of the plates 9 and 10 while the raker tooth is tightly held between the block 19 and the inner end of the dovetail key 21, as shown more particularly in Figs. 3, 4, and 5. It should of course be understood that the key 21 is not secured in place itself by any extraneous means but that it is simply made a tight sliding fit for the space between the blades, since the pressure against it holds it against inadvertent displacement during cutting, and thus the saw blades may be readily removed at any time for sharpening or renewal by pulling them, and the key 21, out from between the plates 9 and 10.

22 and 23 indicate the driving and driven sprockets for operating the saw, these sprockets being preferably formed out of two discs 24—25 and 26—27 respectively spaced apart and held together by spaced pins 28 which act as sprocket teeth and engage the teeth 6 and 7 of the saw sections.

The sprocket 22 is rotatably mounted on a plate 29 having a gripping handle 30 and is provided with a bevel pinion 31 with which meshes a pinion 32 secured to a shaft 33 driven by any suitable source of power, such as a gas engine, while the sprocket 23 is rotatably mounted on a plate 34 provided with gripping handles 35 and 36, the journal of the sprocket 23 being carried by a bearing 37 mounted in a slot 38 formed in the plate so that by means of an adjusting screw 39 the sprocket 23 may be moved longitudinally of the slot and thus the tension on the saw blade may be increased or decreased as required.

40 indicates a metal plate extending between and connected to the plates 29 and 34 depressed along its outer edges out of the plane of the body portion so that the depressed portions 41 and 42 lie under the saw and form carriers for that part of it formed by the plates 9 and 10 and the block 3, the amount of the depression, however, being such that the saw and the plate together will pass as one thickness through the cut made by the saw.

43 and 44 indicate guard plates which cover the sprockets so as to eliminate risk of danger to the operators during the operation of the saw.

The several sections of the saw blade are all connected together end to end by hooking the respective hooks 4 to a pin 45 with which each section is provided and which extends between the plates 9 and 10 straddling the space 5, as shown in Figs. 3 and 4.

The manner in which the device operates will be readily understood as it will be obvious that if the sprocket 22 be rotated the saw will be set in motion to travel around the sprockets so that if supported by the gripping handles and held against a tree the same will be quickly cut through, the light and compact construction of the machine enabling it to be held in any position so that the proper cuts to fell the tree in any required direction are easily made. The other principal advantageous features of the machine will also be apparent, namely, the convenience and facility with which it may be moved from one tree to another or to different points, and the easy manner in which teeth may be removed for sharpening or for replacing broken teeth, while at the same time the entire machine is comparatively inexpensive to manufacture.

What I claim as my invention is:—

1. An endless saw comprising a plurality of sections connected together end to end, each section comprising a block, a pair of plates secured to opposite sides of the block projecting beyond one edge thereof so that a groove is provided along said edge, the projecting portions of said plates being bent inwardly, parallel sets of cutting teeth arranged with their upper parts engaging the inbent portions of the aforesaid plates, the upper parts of said teeth being offset, and a slidable removable key adapted to fit tightly between the said offset portions.

2. An endless saw comprising a plurality of separable sections connected together end to end, each section comprising a block, a pair of plates secured to opposite sides of the block projecting beyond one edge thereof so that a groove is provided along the said edge, a stop block secured between the plates at one end thereof, a saw tooth the root of which is seated in said groove abutting against said stop block, a pair of toothed plates arranged with the upper parts engaging the walls of the groove having cutting teeth formed in their outer parts, and means for removably securing said teeth in place.

3. An endless saw comprising a plurality of endless sections connected together end to end, each section having a block provided with a pair of plates secured to its opposite sides and projecting beyond one edge thereof whereby a groove is provided along the side edge, a stop block secured between the plates at one end of the groove, a saw tooth, the root of which is removably seated in said groove abutting against said stop block, a pair of toothed plates arranged with their upper parts engaging the walls of said groove and their inner ends abutting against said saw tooth, said plates having cutting teeth formed in their lower parts, and a removable key adapted to fit tightly between the upper parts of said toothed plates having its inner end abutting against said saw tooth.

4. In a chain saw, a link comprising a body, independent cutting and raking teeth projecting from the body and a common fastening holding all of said teeth to the body.

5. In a chain saw, a link comprising a body, oppositely disposed cutting teeth projecting from the body, a raking tooth also projecting from the body disposed to operate in a path located between said cutting teeth and a common fastening releasably holding all of said teeth to the body.

6. In a chain saw, a link comprising a body, oppositely disposed cutting teeth engaged with the body, a raking tooth engaged with the body and a key fitting between the cutting teeth and engaging the raking tooth cooperating with the said body to releasably hold all of the said teeth thereto.

7. In a chain saw a link comprising a body presenting a groove, cutting teeth projecting from the body engaged against opposite inner walls of the groove, and retaining means, releasably holding the said teeth in engagement with said walls.

8. An arrangement according to claim 7 in which the said retaining means comprises a key fitting between the teeth.

9. In a chain saw, a link comprising a body presenting a groove and an abutment within the groove at one end thereof, a raker tooth projecting from the body, engaged against said abutment, cutting teeth projecting from the body engaged against the side walls of the groove and a retaining key fitting in said groove between said cutting teeth and having one end engaging said raker tooth to cooperate with the abutment in holding the last named tooth in position.

Dated at Vancouver, B. C. this 9th day of November, 1920.

FRANKLIN FORD PETERS.